United States Patent [19]

Stahlbush et al.

[11] Patent Number: 4,973,607

[45] Date of Patent: Nov. 27, 1990

[54] CATION EXCHANGE RESINS INCORPORATING ANTIOXIDANTS

[75] Inventors: James R. Stahlbush; Robert M. Strom, both of Midland, Mich.

[73] Assignee: The Dow Chemical Company, Midland, Mich.

[21] Appl. No.: 248,529

[22] Filed: Sep. 23, 1988

[51] Int. Cl.$^5$ .............................................. B01J 39/08
[52] U.S. Cl. ...................................... 521/28; 521/31; 521/32; 521/33
[58] Field of Search .................................... 521/28, 30

[56] References Cited

U.S. PATENT DOCUMENTS

| | | | |
|---|---|---|---|
| 3,342,755 | 9/1967 | Calmon et al. | 260/2.2 |
| 4,055,714 | 10/1977 | Sheppard et al. | 525/27 |
| 4,354,007 | 10/1982 | Scott | 525/384 |

FOREIGN PATENT DOCUMENTS 2031906  4/1980  United Kingdom .

OTHER PUBLICATIONS

Stahlbush et al., "Prediction and Identification of Leachables from Cation Exchange Resins", *Proceedings of 48th International Water Conference, Nov. 2-4, 1987.*

*Primary Examiner*—Peter F. Kulkosky

[57] ABSTRACT

Cation exchange resins with improved stability prepared by treating the resins with an antioxidant are disclosed.

19 Claims, No Drawings

CATION EXCHANGE RESINS INCORPORATING ANTIOXIDANTS

BACKGROUND OF THE INVENTION

This invention relates to cation exchange resins. More specifically, it relates to a method of improving the stability of cation exchange resins, and the cation exchange resins prepared from this method.

Cation exchange resins are useful for such applications as water treatment, for example, water softening and water deionization for powerplant boilers (often referred to as "condensate polishing"); chemical purification of food and pharmaceutical products by chromatographic separation, for example, separating fructose from glucose in the production of high fructose corn syrup; and catalysis. Unfortunately, the resins decompose over time and release organic and inorganic impurities into the process stream. Measurable decomposition products may contaminate the process stream and prevent continued use of the resin for a given application.

The decomposition of cation exchange resins is caused by oxidation of the crosslinked, copolymer matrix. The copolymer matrix breaks up as the polymer chains fragment to form various decomposition products, which are described in Stahlbush et al., "Prediction and Identification of Leachables from Cation Exchange Resins", *Proceedings of the 48th International Water Conference* (held Nov. 2-4, 1987). In addition to introducing decomposition products into the process stream, the decomposition of the resin may also adversely affect its chemical and physical properties. For example, the wet-volume capacity and the crush strength of the resin may be reduced.

The rate of release of decomposition products from the resin can vary significantly depending on the amount of crosslinking present in the copolymer matrix and the ionic form of the resin. Generally, the rate of release increases as the level of crosslinking decreases. The hydrogen form of the resin is typically more stable than other ionic forms of the resin, such as the calcium, sodium or ammonium forms of the resin. Therefore, resins in ionic forms other than the hydrogen form and with low levels of crosslinking are most susceptible to unacceptably high rates of decomposition. Unfortunately, resins with these characteristics are often required for numerous applications. For example, a cation exchange resin in the calcium form with low levels of crosslinking is the preferred resin for the chromatographic separation of fructose from glucose in the production of high fructose corn syrup. However, even resins with minimal rates of decomposition may be unsuitable for certain applications if trace amounts of decomposition products in the process stream cannot be tolerated.

Attempts have been made to improve the oxidation resistance of cation exchange resins. U.S. Pat. No. 3,342,755 discloses halogenating the crosslinked copolymer matrix before functionalizing the resin to increase oxidation resistance. Unfortunately, large amounts of halogenating agents are required for significant improvements.

In view of the lack of an available method in the prior art to increase the stability of cation exchange resins, a method of improving the stability of a cation exchange resin is needed.

SUMMARY OF THE INVENTION

In one aspect, the invention is a method of improving the stability of a cation exchange resin. The method comprises the step of contacting the resin with an antioxidant under conditions sufficient to substantially incorporate an effective amount of the antioxidant into the resin.

In another aspect, the invention is a cation exchange resin having improved stability prepared by the method of this invention.

The incorporation of the antioxidant into the cation exchange resin improves the stability of the resin relative to a resin which has not been treated with an antioxidant. The improved resins of this invention are useful in those applications where conventional cation exchange resins are used, especially in those applications where resins in an ionic form other than hydrogen and with low levels of crosslinking are preferred.

DETAILED DESCRIPTION OF THE INVENTION

Processes for preparing cation exchange resins are well known in the art, as exemplified in Helfferich, *Ion Exchange*, McGraw-Hill Book Co., Inc., pp. 26-47 (1962). Advantageously, the resins are prepared by first copolymerizing a monovinyl monomer and a polyvinyl monomer to prepare a crosslinked copolymer matrix, and then functionalizing the copolymer matrix with groups which can exchange cations. Preferred monovinyl monomers include styrene and its derivatives, acrylic or methacrylic acid, and esters of acrylic or methacrylic acid. More preferred monovinyl monomers are the monovinyl aromatic monomers, styrene being the most preferred. Preferred polyvinyl monomers include divinylbenzene (DVB) (commercially available DVB containing less than about 45 weight percent ethylvinylbenzene), trivinylbenzene, and diacrylates or dimethacrylates. More preferred polyvinyl monomers are divinyl monomers, especially divinyl aromatic monomers. The most preferred polyvinyl monomer is DVB. The copolymer matrix is advantageously functionalized with sulfonic, phosphinic, phosphonic, arsenic, or carboxylic acid groups, or phenolic groups. The copolymer matrix is preferably functionalized with sulfonic acid groups.

For purposes of describing this invention, the "stability" of the resin refers to the resin's ability to withstand decomposition during use. Since decomposition is primarily caused by oxidation, a stable resin resists oxidation. Improving the stability of the resin enhances the resin's ability to withstand decomposition, and therefore increases its resistance to oxidation.

Antioxidants useful in the practice of this invention are substances which retard deterioration of the resin by oxidation. Advantageously, the antioxidants are organic compounds. For purposes of describing the invention, an organic compound is a compound having at least one carbon-hydrogen bond. Organic antioxidants are well known and commercially available antioxidants are listed in "Index of Commercial Antioxidants and Antiozonates" (Goodyear Chemicals, 1983 Edition) and "McCutcheon's Functional Materials" (North America edition, 1985, pp. 21-25). Antioxidants listed include monocyclic and polycyclic phenols, amines, diamines, thioesters, phosphites, quinolines, and mixtures of these. Preferred amines are aryl amines, preferably polycyclic aryl amines such as naphthylamines and diarylamines.

The preferred diarylamines are diphenylamines. Preferred diamines are phenylene diamines. Preferred thioesters are esters of thiodipropionic acid.

The preferred class of antioxidants are the monocyclic and polycyclic phenols. Polycyclic phenols include bisphenols, thiobisphenols and polyphenols. Preferably, the antioxidant is a monocyclic phenol, preferably a substituted monohydroxy, dihydroxy, or trihydroxy benzene. Suitable substituents include straight or branched $C_{1-19}$ alkyl, preferably straight or branched $C_{1-4}$ alkyl; methoxy or ethoxy;

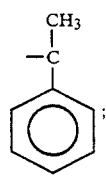

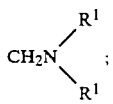

and $-(CH_2)_2CONHR^2$; wherein R is straight or branched $C_{1-19}$ alkyl, preferably $C_{1-6}$ alkyl; each $R^1$ is independently hydrogen or straight or branched $C_{1-19}$ alkyl, preferably hydrogen or straight or branched $C_{1-4}$ alkyl; and $R^2$ is hydrogen or straight or branched $C_{1-19}$ alkyl, preferably hydrogen or $C_{1-6}$ alkyl. The preferred trihydroxy benzene is n-propyl gallate. The preferred dihydroxy benzene is a hydroquinone, preferably t-butylhydroquinone.

The most preferred class of antioxidants are the monohydroxy benzenes. Preferably, the monohydroxy benzene is substituted with one or more t-butyl groups, e.g., 3-t-butyl-4-methoxyphenol. A more preferred monohydroxy benzene is substituted with one or more t-butyl groups on at least one position ortho to the hydroxy group, preferably on each ortho position. Examples include 2,6-di-t-butyl-4-methylphenol (BHT); 2-t-butyl-4-methoxyphenol; 2,6-di-t-butyl-α-dimethylamino-p-cresol; and calcium bis(0-ethyl-(3,5-di-t-butyl-4-hydroxybenzyl)phosphonate). The most preferred antioxidants are BHT and 2,6-di-t-butyl-α-dimethylamino-p-cresol.

The resin and the antioxidant must be contacted in a manner which provides for substantial incorporation of the antioxidant into the resin. The antioxidant is "substantially incorporated" into the resin when a substantial amount of antioxidant is embodied by and remains fixed within the resin, so that an increase in the resin's stability is achieved to the extent necessary or desired. Advantageously, at least about 50 percent by weight of the applied antioxidant is incorporated into the resin. Preferably, at least about 80 percent, more preferably 90 percent, and most preferably 95 percent of the applied antioxidant is incorporated into the resin.

Typically, the antioxidant is dissolved in an appropriate nonreacting solvent and then the antioxidant solution is contacted with the resin for a sufficient time period to substantially incorporate the antioxidant into the resin. The resin can be hydrated, or alternatively, it can be dried before contact is made.

When the antioxidant is a polar compound, it can typically be dissolved in water. If it can act as a nucleophile, it can react with the functional groups of the resin to promote an ionic interaction between the resin and antioxidant. For example, the ionic interaction between a sulfonated resin in the hydrogen form and 2,6-di-t-butyl-α-dimethylamino-p-cresol can be represented as follows:

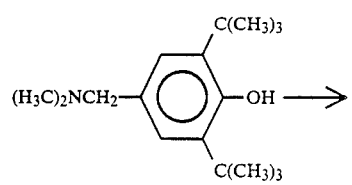

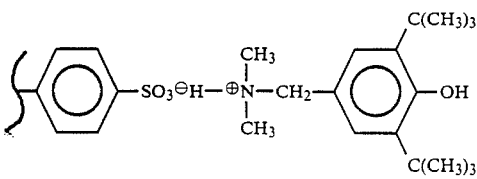

When the antioxidant is nonpolar, it is desirable to imbibe the resin with an antioxidant solution. The imbibed resin is dried to evaporate the nonreacting diluent, and then hydrated to promote further precipitation of the antioxidant. In this manner, the antioxidant becomes entrapped within the micropores of the resin.

Although only two methods, ionic interaction and imbibition and precipitation, are specifically described for substantially incorporating the antioxidant into the resin, other methods for incorporation can be readily determined empirically and are within the scope of this invention.

An effective amount of antioxidant must be substantially incorporated into the resin to improve the stability of the resin. This amount can be determined empirically and depends on the extent of improvement desired and the effectiveness of the specific antioxidant being used. The preferred concentration of antioxidant substantially incorporated into the resin can range from about 0.001 to about 10, preferably from about 0.01 to about 0.5 percent by weight. The most preferred range is from about 0.01 to about 0.2 percent by weight.

If an antioxidant solution is contacted with the resin, the preferred volume ratio for contact between the antioxidant solution and the resin can range from about 1:3 to about 5:1, preferably from about 1:2 to about 2:1. A volume ratio less than about 1:3 is usually insufficient to promote intimate contact with the total surface area of the resin and a volume ratio greater than about 5:1 requires excessive nonreactive diluent which must be removed and in many instances recovered. The concentration of antioxidant in solution can vary over a wide range and depends in part on the volume ratio of antioxidant to resin and the weight percent of antioxidant incorporated into the resin.

The antioxidant and resin can be contacted at any temperature below which degradation of either component can occur. Temperatures greater than room temperature increase the rate of diffusion of the antioxidant into the resin. The preferred contact temperature can range from about 20° C. to about 80° C. The time required for contact can be readily determined empirically.

The following examples illustrate but do not limit the scope of this invention.

EXAMPLE 1

For each of three runs, a cation exchange resin is prepared by heating 100 grams (g) of a crosslinked copolymer (styrene/DVB gel copolymer containing 0.75 percent DVB) in 2,000 g 99 percent sulfuric acid and 40 g methylene chloride at 100° C. for 60 minutes. The reaction mixture is cooled and the resin is washed with water. The resin prepared for the first run contains 90.3 percent water by weight and has a dry weight capacity of 5.18 moles per kilogram.

For each of the three runs, an antioxidant (2,6-di-t-butyl-α-dimethylamino-p-cresol, sold commercially by the Ethyl Corporation as Ethanox® 703) is incorporated into the cation exchange resin.

For the first run, 100 ml of a 0.1 percent aqueous antioxidant solution is stirred with 100 ml (80.0 g) of resin for 30 minutes. The resin is separated from the solution and washed with water. 99 Percent of the antioxidant is incorporated into the resin based on the level of total organic carbon (TOC) in the aqueous solution before and after the 30 minute contact time. The resin contains 0.125 percent of the antioxidant by weight.

For the second run, 100 ml of a 0.03 percent aqueous antioxidant solution is stirred with 100 ml of resin. Similarly, for the third run, 100 ml of a 0.01 percent aqueous antioxidant solution is stirred with 100 ml of resin. The resin for the second and third runs contains 0.036 percent and 0.012 percent of the antioxidant, respectively.

The stability of the resins prepared for each run is determined using an accelerated aging test. Each resin is stirred and heated in 500 ml of DI water at 80° C. while oxygen is continuously purged at 50–60 cc/minute through the water. The TOC of the water is measured at different times to determine the amount of decomposition products released from the resin. The stability of the resins is compared with the stability of an untreated resin. The results appear in Table I.

TABLE I

Stability of Cation Exchange Resin In Hydrogen Form Incorporating Antioxidant

| Concentration of Antioxidant[1] in Resin, Weight Percent | Resin Decomposition Products, Solution TOC[2] (ppm) | | | | | |
|---|---|---|---|---|---|---|
| | 1 day | 2 days | 3 days | 4 days | 5 days | 7 days |
| none[3] | 20 | 200 | 970 | 2300 | no data | no data |
| 0.125 | 12 | 15 | 17 | 21 | 29 | no data |
| 0.036 | 12 | 14 | 22 | 28 | 36 | 48 |
| 0.012 | 36 | 52 | 72 | 100 | 122 | 260 |

[1]Ethanox 703
[2]Determined using a Model 700 TOC analyzer sold by O.I. Corporation
[3]Not an example of this invention The results indicate that the resins treated with the antioxidant release lower amounts of decomposition products relative to an untreated resin. Therefore, the stability of the resins improves when an antioxidant is incorporated into the resin.

EXAMPLE 2

For each of three runs, varying amounts of an antioxidant (2,6-di-t-butyl-α-dimethylamino-p-cresol) are incorporated into a styrene/DVB gel cation exchange resin sold commercially by The Dow Chemical Company under the trademark DOWEX MONOSPHERE® 99.

For the first run, 100 ml of a 0.1 percent aqueous antioxidant solution is placed in a bottle with 100 ml (82.0 g) of the hydrogen form of the resin. The mixture is shaken in an Eberbach shaker for 30 minutes and the solution is filtered from the resin to remove any excess antioxidant not incorporated into the resin. 99 Percent of the antioxidant is incorporated into the resin based on the TOC of the solution before and after the 30 minute contact time. The resin is rinsed with water and converted to the calcium form by passing an aqueous solution of 1,000 ml 4 percent calcium chloride through the resin over about 40 minutes. The resin in the calcium form is then rinsed with water. TOC analysis of the calcium chloride solution which passes through the resin indicates that about 7 percent of the antioxidant is displaced from the resin during the ionic conversion from the hydrogen to the calcium form. Therefore, the resin contains 0.111 percent antioxidant by weight.

In a similar manner for the second and third runs, 100 ml samples of resin in the hydrogen form are stirred with 100 ml of 0.03 percent aqueous antioxidant solution for the second run and 0.01 percent aqueous antioxidant solution for the third run. The resins are then converted to the calcium form. The resins contain 0.037 percent and 0.011 percent of the antioxidant by weight, respectively.

Each of the three resins is analyzed for stability using the procedure outlined in Example 1 and compared with an untreated resin. The results appear in Table II.

TABLE II

Stability of Cation Exchange Resin In Calcium Form Incorporating Antioxidant

| Concentration of Antioxidant[1] in Resin, Weight Percent | Resin Decomposition Products, Solution TOC[2] (ppm) | | | | |
|---|---|---|---|---|---|
| | 1 day | 2 days | 3 days | 4 days | 5 days |
| none[3] | 410 | 1540 | 2080 | 2470 | no data |
| 0.112 | 7.5 | 22 | 31 | no data | 60 |
| 0.037 | 17 | 25 | 45 | 110 | 940 |
| 0.011 | 23 | 325 | 1000 | 1260 | 1780 |

[1]Ethanox 703
[2]Determined using a Model 700 TOC analyzer sold by O.I. Corporation
[3]Not an example of this invention The results indicate that the treated resins release lower amounts of decomposition products relative to the untreated resin despite conversion of the resins from the hydrogen form to the calcium form. Therefore, conversion of the resin from one ionic form to another does not adversely affect the ability of the antioxidant to improve the stability of the resin.

EXAMPLE 3

75 Milliliters (61.5 g) of DOWEX MONOSPHERE® 99 in the hydrogen form is completely dried in a vacuum oven. 28 Grams of a 0.20 percent solution of antioxidant (BHT) and methanol is added to the dried resin with mixing. The methanol is then evaporated from the resin by heating the resin in a vacuum oven. After removing the methanol, water is added to the resin. The resin is rinsed with water, converted to the calcium form and analyzed for stability as described in Examples 1 and 2. The stability of the resin is compared with an untreated resin. The results appear in Table III.

TABLE III

Comparison of Stabilities of Resin in Calcium Form With and Without Antioxidant

| Antioxidant Used | Resin Decomposition Products, Solution TOC[1] (ppm) | | | | |
|---|---|---|---|---|---|
| | 1 day | 2 days | 3 days | 4 days | 6 days |
| none[2] | 410 | 1540 | 2080 | 2470 | no data |
| BHT | 9 | 10 | 12 | 13 | 15 |

[1] Determined using a Model 700 TOC analyzer sold by O.I. Corporation
[2] Not an example of this invention.

The results illustrate a dramatic reduction in the release of decomposition products from the resin treated with BHT relative to the untreated resin. Therefore, different antioxidants can be used to improve the stability of the resin.

What is claimed is:

1. A method of improving the stability of a cation exchange resin made from vinyl monomers which comprises contacting the cation exchange resin with at least 0.01 weight percent organic antioxidant, and the cation exchange resin releases lower amounts of decomposition products as compared to a cation exchange resin not treated with the antioxidant, and wherein said cation exchange resin contains no antioxidants bonded to said resin backbone.

2. The method of claim 1 wherein the antioxidant is a monocyclic or polycyclic phenol, an amine, a diamine, a thioester, a phosphite, a quinoline, or a mixture of any of these.

3. The method of claim 2 wherein the antioxidant is a monocyclic or polycyclic phenol.

4. The method of claim 3 wherein the antioxidant is a monocyclic phenol.

5. The method of claim 4 wherein the monocyclic phenol is a substituted monohydroxy, dihydroxy or trihydroxy benzene.

6. The method of claim 5 wherein the trihydroxy benzene is n-propyl gallate.

7. The method of claim 5 wherein the dihydroxy benzene is t-butylhydroquinone.

8. The method of claim 5 wherein the monocyclic phenol is a monohydroxy benzene.

9. The method of claim 8 wherein the monohydroxy benzene is 3-t-butyl-4-methoxyphenol.

10. The method of claim 8 wherein the monohydroxy benzene is substituted with one or more t-butyl groups on at least one position ortho to the hydroxy group.

11. The method of claim 10 wherein the monohydroxy benzene is substituted with t-butyl groups on each position ortho to the hydroxy group.

12. The method of claim 11 wherein the phenol is BHT, 2-t-butyl-4-methoxyphenol, 2,6-di-t-butyl-α-ethylamino-p-cresol, or calcium bis(0-ethyl-(3,5-di-t-butyl-4-hydroxybenzyl)phosphonate).

13. The method of claim 12 wherein the phenol is BHT or 2,6-di-t-butyl-α-dimethylamino-p-cresol.

14. The method of claim 1 wherein the amount of the antioxidant incorporated into the resin is from about 0.001 to about 10 percent by weight.

15. The method of claim 14 wherein the amount of the antioxidant incorporated into the resin is from about 0.01 to about 0.5 percent by weight.

16. The method for claim 1 wherein the resin has a crosslinked copolymer matrix of a monovinyl aromatic monomer and a divinyl aromatic monomer.

17. The method of claim 16 wherein the resin has a crosslinked copolymer matrix of styrene/DVB, functionalized with sulfonic acid groups.

18. An improved stability cation exchange resin having an effective amount of antioxidant incorporated therein prepared by the method of claim 1.

19. An improved stability cation exchange resin having an effective amount of antioxidant incorporated therein prepared by the method of claim 17.

* * * * *

UNITED STATES PATENT AND TRADEMARK OFFICE
CERTIFICATE OF CORRECTION

PATENT NO. : 4,973,607

DATED : November 27, 1990

INVENTOR(S) : James R. Stahlbush and Robert M. Strom

It is certified that error appears in the above-identified patent and that said Letters Patent is hereby corrected as shown below:

Column 3, line 17, the formula:

"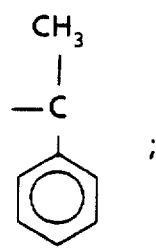;"

Should correctly appear as:

--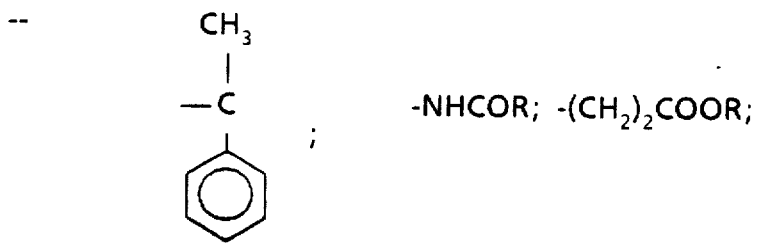--.

UNITED STATES PATENT AND TRADEMARK OFFICE
CERTIFICATE OF CORRECTION

PATENT NO. : 4,973,607

DATED : November 27, 1990

INVENTOR(S) : James R. Stahlbush and Robert M. Strom

It is certified that error appears in the above-identified patent and that said Letters Patent is hereby corrected as shown below:

Column 7, line 43, in Claim 3, "claim2" should correctly appear --claim 1--.

Signed and Sealed this

Twenty-first Day of April, 1992

Attest:

HARRY F. MANBECK, JR.

*Attesting Officer*  *Commissioner of Patents and Trademarks*